(No Model.)
G. H. MALTER.
FEED WATER HEATER AND PURIFIER.
No. 320,077. Patented June 16, 1885.
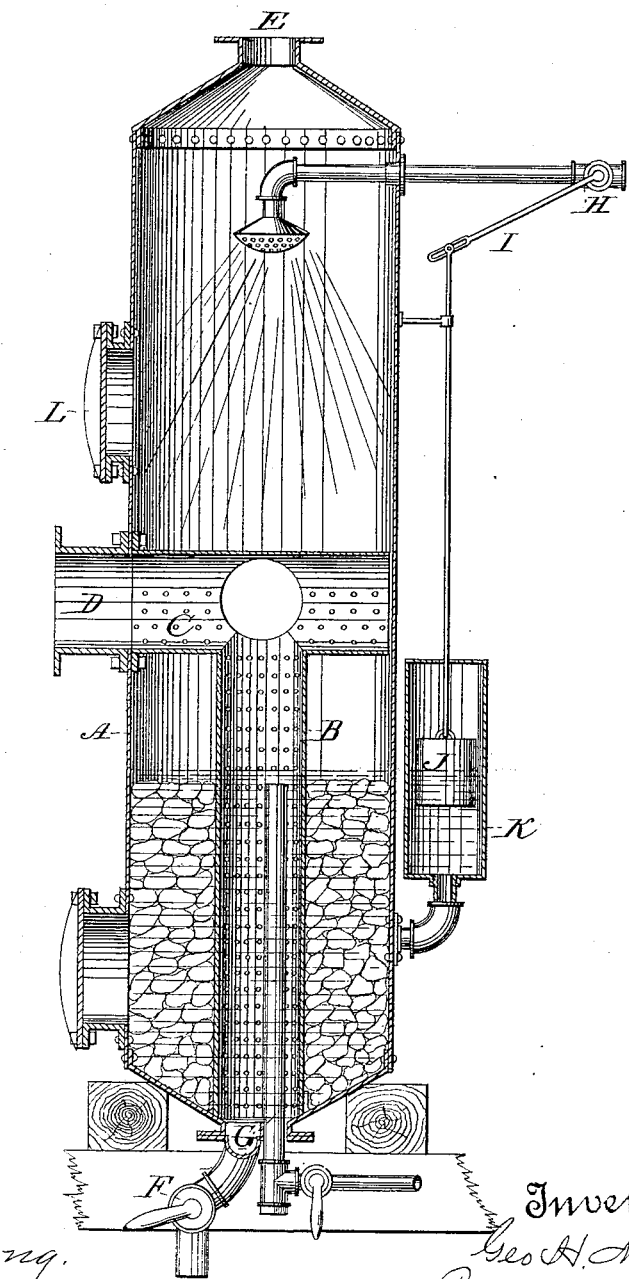

UNITED STATES PATENT OFFICE.

GEORGE H. MALTER, OF SAN FRANCISCO, CALIFORNIA.

FEED-WATER HEATER AND PURIFIER.

SPECIFICATION forming part of Letters Patent No. 320,077, dated June 16, 1885.

Application filed August 19, 1884. (No model.)

*To all whom it may concern:*

Be it known that I, GEORGE H. MALTER, of the city and county of San Francisco, and State of California, have invented an Improvement in a Feed-Water Heater and Purifier; and I hereby declare the following to be a full, clear, and exact description thereof.

My invention relates to an apparatus for heating and purifying water to be used in steam-boilers; and it consists of a chamber or vessel of considerable height, into the upper part of which water is discharged in a spray, a centrally-placed vertical perforated pipe, extending from the bottom up to a point about the center of the chamber, with branching horizontal perforated arms at the top, and an ingress-pipe through which exhaust-steam is admitted from the engine. The space around the vertical pipe is filled with a material which will cause the lime or other substances held in the water to deposit, and a pipe from the bottom serves to blow off any free sediment from time to time. Within the vertical perforated pipe is a closed pipe extending up to some distance above the bottom, receiving clear water through its upper end and having its lower end connected with the feed-water pipe.

Referring to the accompanying drawings for a more complete explanation of my invention, the figure is a vertical section of my apparatus.

In the construction of feed-water heaters and purifiers various materials have been used to cause a deposit of lime, silicious or other scale-producing or deleterious substances, which are held in solution in many kinds of water. These materials have usually been placed in the upper part of a chamber upon a perforated diaphragm, and the lower part used as a hot-water chamber, the feed-water being introduced at the top and flowing down through the material, while the exhaust-steam enters below and passing up through the material meets it. The filtered water is contained in the chamber below, and is liable to be filled with any free sediment which is not stopped in the upper part, and may thus be carried again into the boiler.

In my invention, A is a chamber, which is preferably made of boiler-iron, cylindrical in shape, and three or four times as long as the diameter. This cylinder stands vertically, and may have its ends closed by conically-shaped heads, as shown. A tube, B, of considerable diameter extends upward from the bottom to a point about midway of the height, and connects at the top with transverse branches C, as shown. The sides of the tube B and the lower part of the branches C are perforated with holes, and steam from the exhaust-pipes of the engine is admitted to the tubes or pipes through one of the branches, as at D, being discharged outward into the chamber A through the holes, in jets. The space in the lower part of the chamber A, surrounding the tube B and beneath the branches C, is filled to any desired or suitable height with a material suitable to retain the precipitate from the water. At the top of the chamber A is a pipe with a rose or spray, through which water is admitted, and falling downward upon the material surrounding the pipe B it is heated by the jets of exhaust-steam thrown out through the perforations in the pipe. The steam not condensed by this operation finds its way upward through the mass of material and escapes by way of the opening and pipe E at the top. From the bottom of the chamber A a pipe opens downward from a point beneath the tube B, and is provided with a blow-off cock, F. A pipe, G, extends up through the bottom of the chamber and inside the tube B, its upper end being nearly as high as the proposed height of water within the chamber and tube, and open to admit water from above. This pipe connects with the feed-pump, and water is admitted through its upper end and conveyed to the boiler.

H is a valve in the pipe which supplies water to the apparatus, with a lever-arm, I, and a rod connecting with a float, J, in a chamber, K, at the side of A, and connected therewith. The water stands at the same level within both chambers, and when it rises as high as desired the float operates the valve H in the supply-pipe and closes it.

In this apparatus the filtering or depositing material is placed in the bottom of the chamber surrounding the vertical perforated pipe B, and beneath the pipe through which the steam enters. The water entering from above falls in a spray upon the material, and the steam is forced outward from the pipe through perforations, so as to heat the mass and the water, thus causing the deposit of lime or scale-producing substances. Any free sediment will settle to the bottom, and may be blown off from time to time by means of the cock and pipe at F. The pipe G, which supplies the boiler, extends up within the pipe B to such a height that only the clear water from the upper part will flow into it.

L is an opening with a cover which may be removed to remove or renew the filtering material.

Having thus described my invention, what I claim as new, and desire to secure by Letters Patent, is—

1. In a feed-water heater and purifier, a vertical cylinder or chamber, a perforated pipe within said chamber, extending upward from the bottom to a point near the center, with transverse branches at the top and a pipe through which exhaust-steam is admitted to its interior, a mass of filtering or purifying material surrounding said pipe in the lower part of the chamber, and a rose or spray jet in the upper part of the chamber through which water is supplied, substantially as herein described.

2. In a feed-water heater and purifier, a vertical cylinder or chamber, a vertical perforated pipe extending upward from the bottom within said chamber, surrounded with the filtering material and receiving the exhaust-steam into its interior, and a supply-pipe at the top of the chamber through which water is sprayed downward upon the material, in combination with a blow-off pipe and cock at the bottom of the chamber, substantially as herein described.

3. In a feed-water heater and purifier, a vertical cylinder or chamber, a vertical perforated pipe extending upward from the bottom, surrounded with the filtering material and receiving exhaust-steam into its interior, a water-supply pipe above, and a blow-off or discharge pipe at the bottom, in combination with a vertical pipe within the perforated pipe, having its top open near the surface of the contained water to receive it, and connected with the boiler-supplying apparatus, substantially as herein described.

In witness whereof I have hereunto set my hand.

GEORGE H. MALTER.

Witnesses:
E. H. THARP,
JAMES MASON.